(No Model.)
G. W. BILLINGS.
APPARATUS FOR MANUFACTURING GAS.
No. 272,848. Patented Feb. 27, 1883.
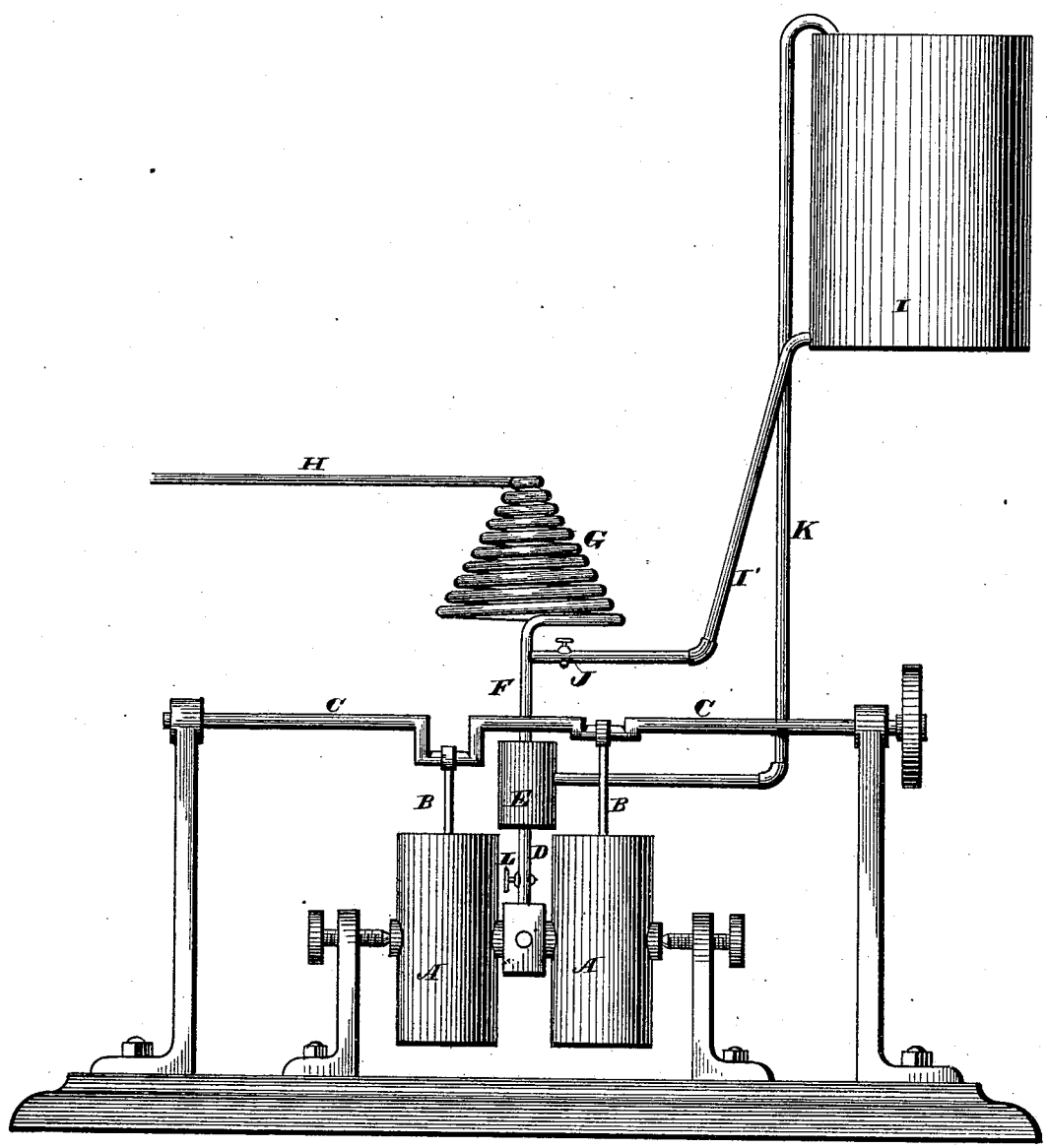
WITNESSES
INVENTOR
ATTORNEYS

UNITED STATES PATENT OFFICE.

GEORGE W. BILLINGS, OF CLEVELAND, OHIO.

APPARATUS FOR MANUFACTURING GAS.

SPECIFICATION forming part of Letters Patent No. 272,848, dated February 27, 1883.

Application filed May 14, 1881. (No model.)

*To all whom it may concern:*

Be it known that I, GEORGE W. BILLINGS, of Cleveland, in the county of Cuyahoga and State of Ohio, have invented certain new and useful Improvements in an Apparatus for Manufacturing Gas; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

My invention relates to improved apparatus for manufacturing gas for illuminating and heating purposes from hydrocarbon oils, the object of the invention being to produce a gas composed of a small quantity of atomized hydrocarbon, mingled with a comparatively large volume of air, the process, which is purely mechanical, resulting in the reduction of the oil to such a perfect degree of atomization that it is practically non-condensable—that is to say, it suffers no condensation under any of the temperatures or pressures to which gas is ordinarily subjected.

With this object in view my invention consists in the apparatus to be hereinafter described, and pointed out in the claims.

The accompanying drawing represents in side elevation an apparatus for manufacturing gas embodying my invention.

A A are oscillating cylinders, which, together with their plungers B B, driving-shaft C, and other auxiliary attachments, constitute a continuously-acting air pump and compressor, adapted to force a constant current of compressed air through the pipe D into an equalizing-chamber, E, connected by pipe F with the base-coil of the conical helix G of tubing, which is connected by a pipe, H, with any suitable gasometer.

I is a tank containing the petroleum, naphtha, or other solidified hydrocarbon oil which it is desired to atomize and mingle with air to form a gas for heating or illuminating purposes. The said tank is connected with pipe F, through which the air compressed in the continuously-acting pump is forced by a conduit, I', which is provided at any point of its length with a valve, J, to regulate the amount of oil admitted to the pipe F. The said valve J may be of any approved form of construction; but a needle-valve will admirably fulfill the requirements here demanded. On account of the volatile nature of petroleum, naphtha, their distillates, and other natural oils, it is not advisable to leave them in an unsealed reservoir; but provision must be made to supply the space in a reservoir caused by the withdrawal of a portion of its contents with air, in order to maintain an equilibrium of pressure, and the consequent free discharge of the oil. This result is effected by connecting the top of the reservoir and the equalizing-chamber E by an air-pipe, K. By means of this arrangement the oil flowing from the reservoir to pipe F is immediately replaced by air flowing from the equalizing chamber through pipe K into the reservoir, a vacuum is avoided, the reservoir is virtually sealed, and all dangerous consequences that might result from the volatilization of the oil are done away with. A valve, L, located in pipe F below the point at which the conduit I' is connected with it, is provided, in order that the volume of compressed air admitted to the worm in a given time may be regulated.

Having explained the construction of my apparatus, I will proceed to briefly describe its mode of operation.

The air-pump is first set in operation to establish a continuous current of air flowing through the pipe D, equalizing-chamber E, pipe F, and worm G. The valve J, located in conduit I, controlling the discharge of oil from the reservoir, is now opened sufficiently to allow a small quantity of oil to flow into pipe F. The instant that the oil enters the said pipe it will be caught by the current of air flowing rapidly therethrough and carried into the worm conical helix G, through which the mingled air and oil pass with a constantly-contracting centrifugal motion involving great friction, the result whereof is the reduction of the oil to a degree of such perfect atomization as to be non-condensable under any of the pressures or temperatures to which gas is ordinarily subjected, and the homogeneous distribution of the said atomized oil throughout the whole volume of air. The amount of hydrocarbon oil supplied to the air-current will determine the percentage of carbon in the gas and determine its adaptation to illuminating or heating purposes.

I would have it understood that I do not limit myself to the exact process and apparatus herein described, but hold myself at liberty to make such slight changes and alterations as fairly fall within the spirit and scope of my invention.

Having fully described my invention, what I claim as new, and desire to secure by Letters Patent, is—

1. The combination, with a conical helix of tubing, of an air-compressing apparatus, pipes connecting the same and the base-coil of the conical helix, and devices to supply oil in small quantities to the said connecting-pipes, substantially as described.

2. The combination, with a conical helix of tubing, of an air-compressing apparatus, pipes connecting the same with the base-coil of the helix, an equalizing-chamber located in said pipes, an oil-reservoir, a conduit leading from said reservoir to the air-pipes, and an air-tube connecting the top of the reservoir with the equalizing-chamber, substantially as set forth.

In testimony that I claim the foregoing I have hereunto set my hand this 9th day of May, 1881.

G. W. BILLINGS.

Witnesses:
HERMAN MORAN,
A. W. BRIGHT.